July 5, 1955  F. P. LARSEN  2,712,294
UNDERINFLATED TIRE WARNING DEVICE
Filed Aug. 3, 1954

2,712,294

UNDERINFLATED TIRE WARNING DEVICE

Frederic Pierre Larsen, Paris, France

Application August 3, 1954, Serial No. 447,461

Claims priority, application France February 16, 1954

3 Claims. (Cl. 116—34)

This invention relates generally to signal devices, and more particularly to devices adapted to be attached to pneumatic tires and which emit a sound when said tires become deflated or when the pressure therein falls below a predetermined value so that the driver is aware of the abnormal condition of the tire.

Devices of this type have already been designed and are adapted to be mounted on a wheel rim to extend against the side wall of a pneumatic tire so that they are actuated when the casing of the tire spreads out laterally each time the wheel makes one revolution should the tire become under-inflated.

Among the devices of the prior art one embodiment includes a pair of elongated flexible sounding strips with two ends thereof securely attached in a mounting flange adapted to be mounted on a wheel rim while the other ends of said strips are clamped together in such a manner as to permit relative sliding movement therebetween. It has been found, however, that such devices are too weak, owing to the possible relative sliding movement between the outer ends of the sound strips, and such weakness results in the warning sound not being strong enough for the driver to hear it, particularly in city streets where the traffic is very dense and noisy.

The object of this invention is to provide a tire signal device of the kind referred to which is capable of emitting a powerful sound signal though it is very simple and therefore economical in manufacture and durable in use.

According to the main feature of the invention, the outer ends of the sound strips are firmly clamped against each other so that any relative sliding movement between said ends is entirely prevented. Such arrangement provides for a much stronger snapping action which results in an amplified clicking sound when the strips are alternately flexed and released.

Figure 2:
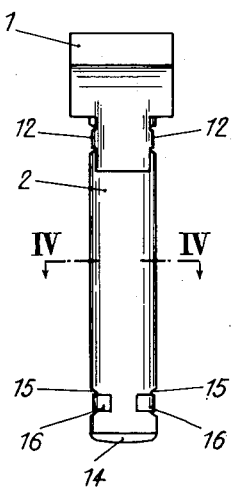
Figure 1:
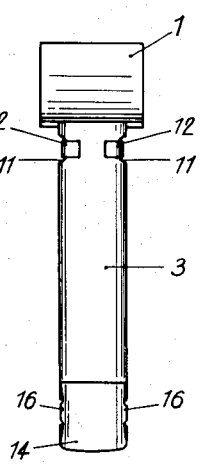
Figure 3:
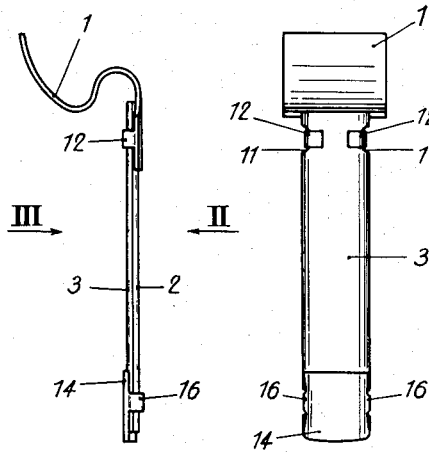
Figure 4:
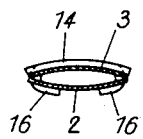
Figure 5:
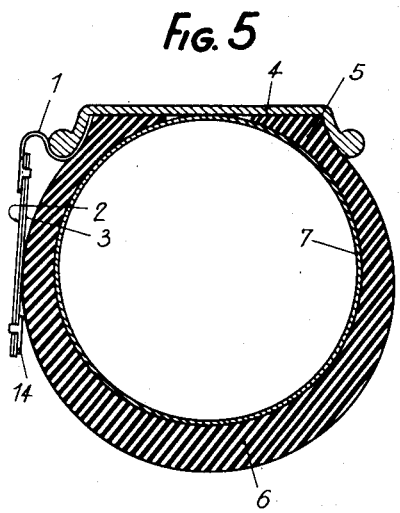
Figure 6:
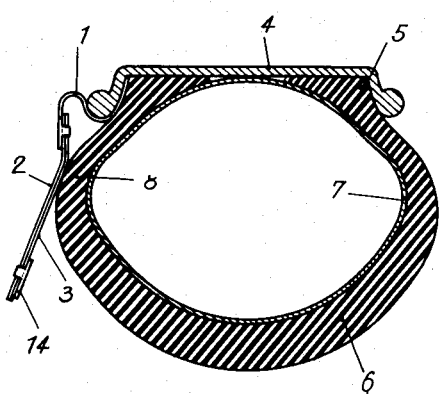

Other and further objects and advantages of the invention will be apparent to those skilled in the art, from a consideration of the following description of one specific embodiment of the invention, shown by way of example, in the accompanying drawings, in which:

Fig. 1 is a side elevational view of a preferred embodiment of the invention,

Fig. 2 is a front elevational view as seen in the direction of the arrow II in Fig. 1, Fig. 3 is a corresponding rear elevational view as seen in the direction of the arrow III in Fig. 1, Fig. 4 is a cross-section taken along the line IV—IV of Fig. 2, and Figs. 5 and 6 show in cross-section a rim and tire with the sounding device of the invention installed in operative position thereon with the tire in inflated and deflated conditions respectively.

Referring now to the drawings, and particularly to Figs. 1 to 4 thereof, the numeral 1 indicates a supporting flange which has a generally S-shaped curvature, and which is adapted to be inserted between the bead of a wheel rim 4 and the inner portion of a pneumatic tire 6 (see also Figs. 5 and 6).

Attached to the supporting flange 1, in a particular manner which will be described further on in detail, are a pair of sounding elements or reeds 2 and 3. Each of said reeds is formed as a straight strip of resilient flexible material such as spring steel of uniform arcuate cross-section and therefore has a convex face and a concave face. Both reeds are arranged with their concave faces facing each other while the edges of one reed are respectively in mutual engagement with the edges of the other reed.

Near one end of both reeds, the edges thereof are provided with notches 11 while the terminal end of the mounting flange 1 is formed with lugs 12 adapted to embrace both reeds in the notches 11. Said lugs 12 are not crushed flat against the reeds but instead, they are only bent gently upon the convex face of the reed 3 so as to preserve the arcuate cross-section of both reeds. In order that the reeds, however, be firmly secured to the mounting flange 1, the adjacent end of said mounting flange is also arcuate in cross-section so as to fit closely against the convex face of the reed 2 all over the breadth thereof.

It is an important feature of the invention that the other ends of the reeds 2 and 3 are firmly secured to each other. To this aim, a clamp 14 is provided the mounting of which is similar to that of the flange 1 on the opposite ends of the reeds. Both reeds are provided at their free ends with lateral notches 15 adapted to be embraced by mounting lugs 16 formed on said clamp 14.

As it will be clearly seen in Fig. 4, the lugs 16 are also bent according to the curvature of the reed 2, and the clamp 14 has a curved cross-section which fits closely upon the convex face of the reed 3. In this manner the chamber formed between the reeds is preserved all over the length thereof.

The clamp 14 has a substantial length so that the adjacent ends of both reeds are firmly clamped against each other and, furthermore, no clearance is left between the sides of the notches and the mounting lugs so that any relative sliding movement of the adjacent ends of the reeds is strictly prevented.

The whole arrangement is so designed that the outer convex face of the reed 3 is slightly pressing against the side of the tire casing 6 as it will be seen in Fig. 5, when the tire is properly inflated. The assembly of the two reeds is substantially rectilinear throughout the length thereof.

Should the pressure within the inner tube 7 of the tire fall below a normal predetermined value, the weight of the vehicle causes the tire walls to bulge outwardly near the road surface. As the wheel rotates, the bulge moves around the periphery of the tire and upon each revolution passes the sound device which, at each time, is first highly stressed and then suddenly snaps laterally outwardly with a sharp cracking noise (Fig. 6). As the point of the wheel where the sound device is mounted rises away from the level of the road, the bulge of the tire casing decreases in breadth and the reeds are restored to their initial rectilinear form under the resiliency of the material they are made of, again emitting a sharp cracking noise. This snapping action is due to the fact that at the point where the assembly of the two reeds is flexed, the cross-section thereof suddenly passes from its initial arcuate form to a rectilinear form and, vice versa, when they are restored to their initial position, the cross-sections suddenly pass from a straight line to an arcuate line.

Since both ends of the two reeds are firmly clamped against each other, in the mounting flange 1 as well as in the end clamp 14, it is readily understood that the assembly of the two reeds constitutes a relatively rigid stick which is therefore adapted to buckle with a particularly strong click, and which is restored back to its initial rectilinear position also while emitting a sharp strong clicking noise.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

What I claim is:

1. An underinflated tire warning device comprising in combination a flange adapted to be mounted on a wheel rim, a pair of elongated rectilinear resilient reeds having a curvilinear cross section arranged with their concave faces facing each other and rigidly secured at one end thereof to said flange in such manner that one of said reeds is positioned for engagement with the side wall of the tire mounted on said rim, and a clamp rigidly securing the outer ends of said reeds against each other so that no relative sliding movement between said outer ends of said reeds occurs.

2. A device according to claim 1, wherein said clamp has a substantial length extending along the length of said reeds.

3. A device according to claim 1, wherein said reeds are provided with registering lateral notches and said clamp comprises a small plate fitting closely over the outer convex face of one of said reeds and formed with two lateral lugs housed without any clearance in said registering lateral notches of said reeds and bent over the convex outer face of said other reed, in such manner that the curvilinear cross-section of said reeds is preserved throughout the length thereof.

References Cited in the file of this patent

UNITED STATES PATENTS

| | | |
|---|---|---|
| 2,521,280 | Bowman, Jr. | Sept. 5, 1950 |
| 2,654,337 | Fidler | Oct. 6, 1953 |